United States Patent [19]

Visser et al.

[11] Patent Number: 5,188,842
[45] Date of Patent: Feb. 23, 1993

[54] EDIBLE PLASTIC COMPOSITIONS

[75] Inventors: Johannes Visser; Marinus Bakker, both of Maassluis, Netherlands

[73] Assignee: Van den Bergh Foods Co., Division of Conopco, Inc., Lisle, Ill.

[21] Appl. No.: 367,069

[22] Filed: Jun. 16, 1989

[30] Foreign Application Priority Data

Jun. 16, 1988 [EP] European Pat. Off. ........ 88201237.0

[51] Int. Cl.$^5$ ............................ A61K 35/20; A23J 3/22
[52] U.S. Cl. .................................... 424/535; 530/833; 426/583; 426/656; 426/657; 426/804
[58] Field of Search ........................ 424/535; 530/833; 426/583, 656, 657, 804

[56] References Cited

U.S. PATENT DOCUMENTS

| 4,209,503 | 6/1980 | Shah et al. .............................. 424/49 |
| 4,734,287 | 3/1988 | Singer et al. ........................... 426/41 |
| 4,961,953 | 10/1990 | Singer et al. ......................... 426/656 |

FOREIGN PATENT DOCUMENTS

| 504076 | 1/1977 | Australia . |
| 22400/77 | 2/1977 | Australia . |
| 46301/79 | 4/1979 | Australia . |
| 519300 | 4/1979 | Australia . |
| 82677 | 12/1987 | Australia . |
| 0058276 | 8/1982 | European Pat. Off. . |
| 0076549 | 4/1983 | European Pat. Off. . |
| 0101105 | 2/1984 | European Pat. Off. . |
| 0250623 | 1/1988 | European Pat. Off. . |
| 0323529 | 7/1989 | European Pat. Off. . |
| WO88/0452 | 10/1987 | PCT Int'l Appl. . |
| 2035360 | 6/1980 | United Kingdom . |

OTHER PUBLICATIONS

Walestra & Jennes Dairy Chem. and Phys. p. 172, FIG. 10.5.
Australian Search Report.

*Primary Examiner*—Douglas W. Robinson
*Assistant Examiner*—Jean C. Witz
*Attorney, Agent, or Firm*—Gerard J. McGowan, Jr.

[57] ABSTRACT

An edible plastic composition contains at least 5 wt. % of heat-denatured protein, the heat-denatured protein mainly being a dispersion in the form of non-aggregated protein-based macrocolloidal particles having a size in the range of from 0.1 to 10 microns. It is suitable as a low calorie fat replacer in food products and for topical applications and is prepared by successive heating and concentrating steps in which an aqueous composition comprising less than 15% by weight of the water, of heat-denaturable protein is at least partly denatured and the protein concentration of the aqueous composition is at least doubled and at least part of any soluble protein is removed.

The present process for instance offers the advantage of not requiring complicated apparatus, and moreover is easy to control.

12 Claims, No Drawings

EDIBLE PLASTIC COMPOSITIONS

The present invention relates to edible plastic compositions a process for their preparation.

A process is described in European patent application No. 0 250 623 for the preparation of whey protein dispersions having a particle size range 0.1 to 2.0 microns. The process comprises heat-treating an aqueous solution of undenatured whey proteins at 80°-130° C. and pH 3.5-5.0 so as to denature said proteins under conditions of high shear for sufficient time to avoid the formation of fused proteinaceous aggregates in the product. The process is said to be based on the observation that heat denaturation of whey proteins having a particle size of about 17 Angstroms proceeds in a discrete two stage transition from the native whey protein to the large heat-denatured aggregated whey proteins about 15-175 microns in size which form a gel the micro structure of which is pH-dependent, via an intermediate form of non-aggregated particles 0.1-2 microns. These latter exhibit desirable organoleptic response when dispersed in an aqueous medium, aptly described as an emulsion-like mouthfeel closely approximating to that of fat/water plastic emulsions, when the proteins are hydrated.

We have found that a similar edible plastic product comprising an aqueous microcolloidal dispersion may be obtained without the necessity of subjecting the aqueous protein solution to high shear condition, by a process comprising successively heating and concentrating an aqueous composition comprising less than 15% by weight of the water, of heat-denaturable protein so as to at least partly denature said protein and at least double the protein concentration of the aqueous denatured protein composition to provide a plastic composition comprising at least 5 wt. % of heat-denatured protein in the form of non-aggregated protein-based microcolloidal particles preferably having a size in the range of from 0.1 to 10 microns, but including up to 50 microns, more particularly 5-30 microns. The smaller ranges give a particularly non-grainy product for food products but the larger ranges are also acceptable according to their application.

The present process offers the advantage that it may be carried out with relatively simple apparatus of the kind usually available in dairy processing plants, and does not require the use of a fluid processing device as described in EP-A 0 250 623. It is relatively easy to control, due to the fact that it neither requires high shear conditions nor is it essential to adopt very short heating times, nor such high temperatures. It also allows the incorporation of shear-sensitive ingredients, such as starches and gums or other thickening agents, in the protein containing aqueous composition prior to the heat treatment. At the relatively low temperatures of the invention these nevertheless do not interact with the protein through the Malliard or other reactions. In the present process the heat treatment which results in the denaturation of proteins may thus additionally serve the purpose of pasteurizing the ingredients of the final product even if these ingredients are sensitive to shear.

The products obtained with the present process, when viewed under a microscope, in particular if concentrated to a high protein content, may seem to comprise a protein-network, i.e. not to be built up of non-aggregated protein-based microcolloidal particles. In fact a protein-network is absent and conversely the presence of non-aggregated particles, may be readily demonstrated by diluting the concentrated product with water. After the addition of the water, under slow stirring, the products obtained by the present process, will form a homogeneous suspension, whereas products comprising a protein network will only form a homogeneous suspension if subjected to high shear.

By a plastic composition, as referred to throughout this application, is meant a composition having a consistency which may be compared with products like yogurt, cream, quark, spreads and processed cheese. Preferably the products obtained by the present process have a rather firm consistency, i.e. a consistency similar to quark, spreads or processed cheese.

In the present process the heat-denaturable protein applied, is preferably selected from the group of proteins consisting of: whey protein, egg-albumin, soya protein, gluten protein, which may be enzymatically modified and blood albumin. For such preparations insoluble matter including protein and carbohydrates present must first be separated and a soluble protein fraction used in the process of the invention. The properties of the plastic composition obtained depend on the particular protein used. To obtain a composition meeting specific demands with regard to, for instance, its rheological properties, different proteins may favourably be applied in combination. Non-dairy protein products of the process according to the invention are novel compositions of matter.

Preferably the aqueous composition used is dairy whey, optionally delactosed. This embodiment offers the advantage of being very economical as it allows the use of non-upgraded whey. Moreover, if whey applied in the present process is first concentrated, a valuable by-product in the form of a lactose-enriched, deproteinated aqueous composition is additionally obtained.

Although in the present process the aqueous composition, prior to the heat treatment may contain as much as 15%, by weight of the water, of heat-denaturable protein, it is preferred to apply a protein content of less than 8 wt. % and more than 0.5 wt. % of heat-denaturable protein. If relatively low concentration levels are applied the final products appear to have a very smooth texture. Such products exhibit less deficiencies such as graininess. In particular, undenatured whey proteins should be preferably heated at a concentration below the critical gel concentration of approximately 8%.

In a preferred embodiment of the present process the aqueous composition is heated in the heating step to a temperature of less than 100° C. more preferably to a temperature between 60° and 80° C. and particularly 65°-75° C. It was found that at higher temperatures, in particular at temperatures above 100° C., off-flavours are generated. The development of such off-flavours is undesirable if the present process is used for the preparation of ingredients for food products or pharmaceuticals. The heating stage of the invention is substantially limited to those conditions of time and temperature which at pH=4.6 render insoluble not more than 10% of proteins in whey. Reference may be made to FIG. 10.5 on page 172 of "Dairy Chemistry and Physics" by Walstra and Jenness (John Wiley & Sons), in which the preferred conditions of the heating step of the present invention appear below the curve along which 10% of whey proteins are rendered insoluble at pH 4.6.

Preferably higher heating temperatures are combined with shorter heating times. Best results are obtained if the aqueous composition is heated less than 1 hour, more particularly from 1 minute to a maximum of 30 minutes, preferably less, within the temperature range 75° to 60° C.

Although at some stage of the present process it may be desirable to stir the aqueous composition, no benefits are obtained from subjecting said composition to high shear. Thus in the present process the aqueous composition, during the heat treatment, is preferably subjected to less shear than 500, more preferably less than 200 reciprocal seconds. Most preferably, during the heat treatment, the aqueous composition is subjected to substantially no shear.

After the heat treatment the aqueous composition may suitably be concentrated by the application of any concentrating-technique known in the art. Examples of such techniques are: ultrafiltration, ion exchange, electro dialysis, micro filtration, or more preferably centrifugation. The suitability of these techniques depend, for example, on the ingredients present in the aqueous composition and on the desired degree of concentration in addition to effectiveness in removing undenatured whey protein.

The concentrating-step in the present process is required both to remove undenatured protein and attain the desired consistency. The more the aqueous composition is concentrated, i.e. the water content reduced, the more firm the concentrated product becomes. Thus, in practice, the degree of concentrating required merely depends on the consistency desired. Since, however, the present process is particularly suitable for producing compositions having a fat-like, spreadable, consistency, it is preferred to concentrate the aqueous composition to a protein content of at least 7 wt. %, more preferably to a protein content of between 8 and 60 wt. %. The aqueous composition may alternatively be dried, for example by freeze or spray drying, so as to obtain a particulate composition containing essentially no water. Since, however, such drying techniques are rather expensive and difficult to control, it is preferred to concentrate the aqueous composition to a protein content of between 8 and 60 wt. %, the balance mainly consisting of water.

Although concentrates having protein contents as high as 60 wt. %, in general, do not possess favourable rheological properties, it may be useful to manufacture such concentrates as they may be diluted at a later state to the desired concentration level without substantial loss of beneficial properties. The desired rheological properties are observed if the protein content of the concentration is in the range of from 8 to 25 wt. %.

The concentrating step in the present process may be facilitated by using techniques to enhance precipitation of the protein by, for example, acidifying the aqueous phase, preferably prior to concentrating. Acidification is preferably in the range below pH=7 to pH 4. Acidification may lead to some increase in particle size, this may be reversed by increasing the pH again after the concentration step to a higher value still below 7, preferably in the range pH 6 to 6.8. Instead of acidification alternative techniques such as addition of certain cations may be used to facilitate the concentrating steps.

The plastic composition obtained by means of the present process comprises protein-based particles having a size, as determined by a Coulter Counter (Tradename) Model ZM particle size analyzer, in the range of from 0.1 to 10 microns. Preferably the particle size distribution of the plastic composition is such that at least 70 vol. %, more preferably at least 85 vol. % of the protein-based particles having a diameter in the range of from 0.4 to 100 microns, having a diameter in the range of from 0.5 to 5 microns, as measured by means of a Coulter Counter Model ZM particle size analyzer. More preferably at least 85 vol. % of the particles have a diameter in the range of from 1-3 microns. If the diameter of the particles becomes rather large, deficiencies such as graininess are observed.

Although in some instances we have found that the particle size distribution observed with the Coulter Counter measurements differed from the size-distribution determined from microscopical images, the distribution measured with the Coulter Counter apparatus (using the technique described in the Manual for the Model ZM, issued in February 1985, part number 9942204, by Coulter Electronics Ltd, Luton, England) appears to give a good indication of the quality of the product.

The products of the invention exhibit good microbiological stability and may be stored with a preservative e.g. K sorbate at 5° C. for two months or more without significant deterioration. They may be used to provide a low calorie food product by replacing at least part of the fat present in such foodstuffs as butter and other dairy products, e.g. cheese, yogurt, margarine and fat-containing emulsion food spreads generally, including chocolate and other flavoured spreads, ice cream, salad dressings and mayonnaise, dairy and non-dairy creams. The products may also be incorporated in creams and other products for topical application to the body, for example in cosmetics optionally in combination with an acceptable vehicle material, for example a fat-based cream.

The present invention is illustrated by the following examples:

EXAMPLE 1

2 liters of 5% aqueous solution (pH=6.7) of Bipro (Tradename) undenatured whey (ex. Bio-isolates PLC, Swansea, UK), was partly denatured by heating 10 minutes at 65° C. A milk-like stable, colloidal dispersion was thus obtained. The colloidal dispersion was acidified to a pH of 4.7 by heating the dispersion to 35° C. after the addition of 0.5 wt. % of glucono-delta-lactone.

The distribution of the diameter of the protein-based particles present in the dispersion was measured by means of a Coulter Counter (Tradename) Model ZM particle size analyser. Most particles appeared to have a diameter in the range of from 1-3 microns. The composition was subsequently concentrated by centrifuge (at 1000 g) after which a spreadable mass, containing about 15 wt. % of protein and 85 wt. % of water was obtained.

Pictures of the plastic product diluted in water were taken under an electron microscope at different magnification. The whey protein is present in the form of non-aggregated microcolloidal particles in the size range 0.1–19 microns, confirmed by Coudlter counter determination. The product after addition of water could easily be converted to a homogeneous suspension by slowly stirring the mixture.

Before the heat treatment beta carotene had been added to the Bipro whey solution. Thus a plastic spreadable composition having a slightly yellow colour was obtained. This coloured spread had an appearance which is very similar to margarines containing a relatively high amount of polyunsaturated fatty acid residues, i.e. when compared with other types of margarines it was slightly more glossy.

The product furthermore appeared to spready easily and, also in some respects, its rheological properties were found to be very similar to those of ordinary spreads such as margarines and low calorie spreads. In addition the oral response of the product was found to be very good as no deficiencies such as graininess, etc. were observed.

EXAMPLE 2

Experiment 1 was repeated except that Albuvir HC 84 (Tradename) ex. Union Latiere Normande, Conde-sur-Vire, France was applied as the whey protein source.

The product obtained resembled the product obtained in Example 1. The oral response of the product, however, was judged to be superior to that of the product of Example 1.

EXAMPLE 3

5 liters of natural whey containing 0.5-0.6% protein, obtained in the preparation of Gouda cheese, after separation of residual casein by means of filtration, were subjected to the heating and concentrating procedure of Example 1. Before the concentrating step the pH of the dispersion was reduced to be 4.3. The product obtained after centrifugation had an appearance and properties similar to the products of Examples 1 and 2.

EXAMPLE 4

120 liters of an aqueous solution containing 5% plate HC 86 whey solution was passed continuously through a plate heat exchanger providing a contact time of 2 minutes at 76° C. Citric acid was then added with stirring to reduce the pH to 5.0 and the protein suspension was centrifuged as described in Example 1, to produce a smooth plastic product with an average particle size of approximately 2 microns. A similar result was obtained from cheese whey on the same scale.

EXAMPLE 5

Soya milk (ex Aarhus O/F) was heated for 15 minutes at 65° C., acidified to a pH=4.7 with 1% glucuno delta lactone and centrifuged at 10,000 g. to produce a smooth plastic product having an average particle size of 3.6 microns resembling the whey protein products of the preceding examples. Fat present in the soya milk was removed from the product in the supernatant liquor.

A similarly smooth product of average particle size 2.4 microns was also obtained by a similar method from the soluble fraction of soya concentrate (Unico 75 Loders Croklaan, Wormerveer, Netherlands).

EXAMPLE 6

Egg albumen obtained by separating yolk from eggs was heated for 15 minutes at 50° C. after dilution with equal part by weight of water and acidified from pH 9.3 to 4.7 by the addition of glucuno delta lactone. After centrifugation as before (1000 g) a plastic composition was obtained with average particle size 3.1 microns.

We claim:

1. A process for the preparation of a plastic food composition comprising successively heating and concentrating an aqueous composition comprising less than 15% by weight of water of heat denaturable protein in order to at least partly denature said protein and to at least double the protein concentration of the aqueous denatured protein composition and they remove at least part of any remaining undenatured protein present to provide a plastic composition comprising at least 5 wt. % of heat denatured prtein in the form of non-aggregated protein-based microcolloidal particles, wherein the composition is subjected to less than 500 reciprocal seconds of shear during the process.

2. The process according to claim 1 wherein the concentration of protein in the aqueous composition is below the critical gel concentration.

3. The process according to claim 1 wherein the aqueous denatured protein composition is concentrated to a protein content of at least 7%.

4. The process according to claim 3 wherein the aqueous denatured protein composition is concentrated to a protein content of between 8 and 60 wt. %.

5. The process according to claim 1 wherein the aqueous composition is heated to a temperature between 60° and 80° C.

6. The process according to claim 1 wherein the aqueous protein composition is heated for a period from 1 to 30 minutes within the temperature range 75° to 60° C.

7. The process according to claim 1 wherein the aqueous composition is subjected to substantially no shear during heating.

8. The process according to claim 1 wherein the aqueous denatured protein composition is concentrated at a pH in the range 4 to 7.

9. The process according to claim 1 wherein the aqueous denatured protein composition is acidified to a pH in the range 4 to 7 after the heating step and before the concentration step.

10. The process according to claim 1 wherein the heat-denaturable protein is selected from the group consisting of egg-albumin, soya, blood albumin, gluten protein and enzymatically modified gluten protein.

11. The process according to claim 1 wherein the aqueous composition comprises dairy whey.

12. The process according to claim 1 wherein the aqueous composition comprises delactosed dairy whey.

* * * * *